United States Patent Office 3,160,743
Patented Dec. 8, 1964

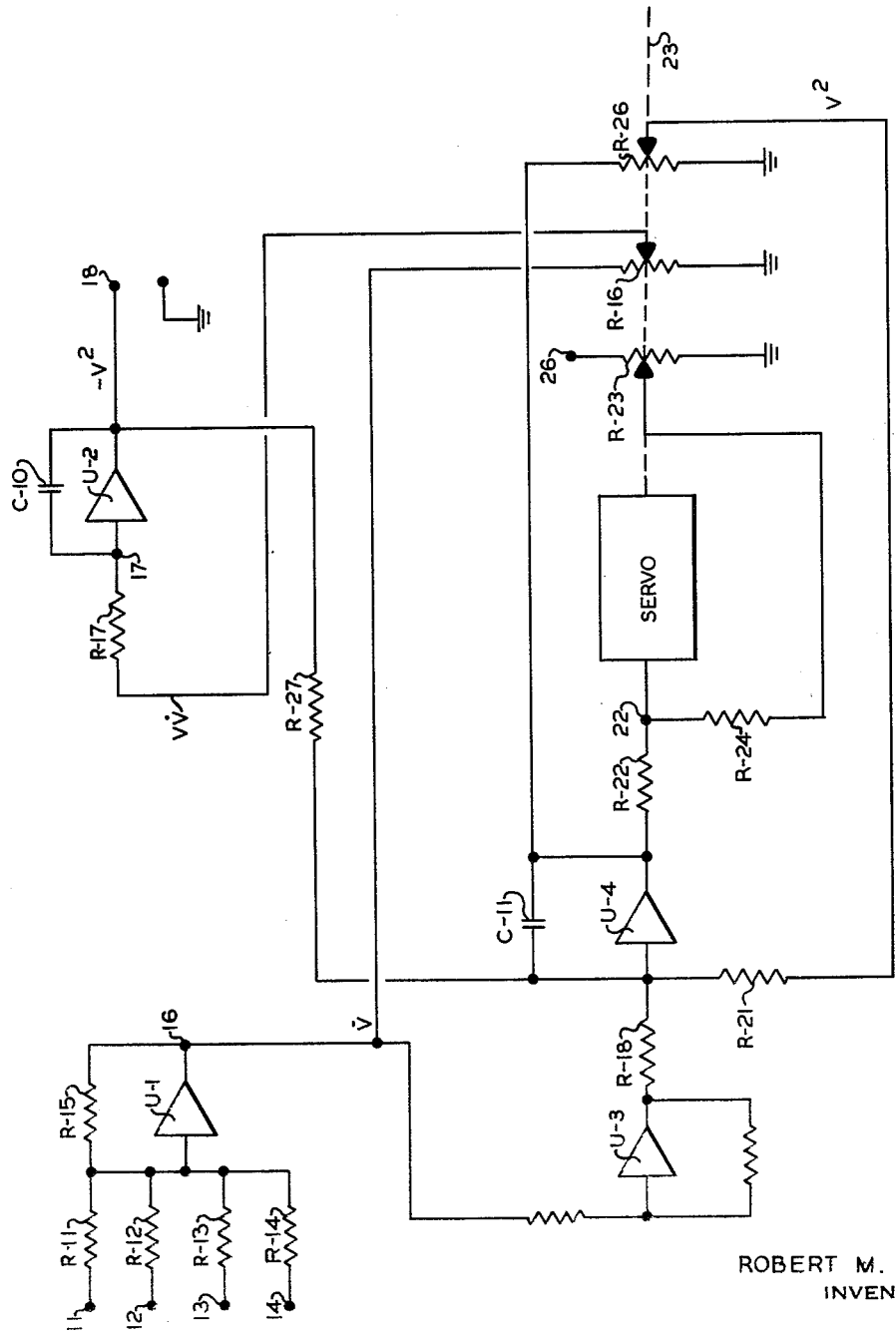

3,160,743
SERVO-OPERATED SQUARING APPARATUS
Robert M. Howe, Ann Arbor, Mich., assignor to General
Precision, Inc., a corporation of Delaware
Filed Apr. 10, 1959, Ser. No. 805,509
6 Claims. (Cl. 235—194)

This invention relates to method and apparatus for use in analog computers, automatic control and instrumentation, and more specifically, to an improved apparatus for deriving an output potential commensurate with the square of a variable from an input potential commensurate with the rate of change of said variable. In numerous analog computer applications, it is often necessary or desirable to obtain such a "squared" voltage, and in very many instances it is imperative that the derived "squared voltage" be free from errors commonly incident to electromechanical function generation. Such errors, which are usually associated with servo multipliers or servo function generators, arise due to inertia, backlash, friction, hysteresis and like limitations of presently available servo equipment and from finite resolution and other defects of servo-driven potentiometers.

Probably the most widely used prior art method of deriving a square output potential from a rate input potential has been to use a "velocity" or integrating servo, the integrating servo output velocity being generated in accordance with the input potential, the output of displacement being used to position a single square function potentiometer or a pair of cascaded linear potentiometers to provide an output potential commensurate with the square of the servo output shaft position. Such a system magnifies the electromechanical limitations of the velocity servo and the potentiometers. It has been proposed heretofore to minimize such electromechanical errors by using an electronic integrator (a direct-coupled operational amplifier with a feedback capacitor, or "Miller" integrator) to integrate the rate input potential, and then to use a conventional position servo both to follow the output potential of the integrator and to operate a potentiometer to multiply the integrator output by itself, thereby deriving the desired "square" potential. This proposed system offers some improvement over the aforementioned system, but still suffers from several important defects. The use of the potentiometer on the position servo shaft in such an arrangement introduces electromechanical errors.

In application Serial No. 676,953, filed August 8, 1957, by Laurence E. Fogarty, for "Flight Simulation Computation," and assigned to the same assignee as the present invention, now abandoned, there is disclosed an improved arrangement for computing a square voltage from a rate input voltage. The Fogarty application discloses the circuit in connection with flight simulator computer apparatus for computing simulated dynamic pressure. The dynamic pressure acting on an aircraft in flight is commonly specified as being commensurate with the product of air density (a function of altitude) and the square of airspeed. Since most of the forces and moments acting on an aircraft are directly proportional to dynamic pressure, it is essential that means for computing "airspeed squared" accurately and without electromechanical "noise" be available, in order that dynamic pressure may be computed accurately and without "noise." While the system disclosed by Fogarty provides substantial improvement in the quality (lack of noise) of the "square" voltage, the voltage still is affected by servo and potentiometer imperfections to some extent.

The Fogarty system contemplates potentiometer multiplication of the input rate term ($\dot{V}$) by a servo connected to provide V as an output shaft position, thereby deriving a $V\dot{V}$ quantity and then electronic integration of the $V\dot{V}$ quantity to provide the desired $V^2$ quantity. The servo is a position servo connected to be driven by the output of a second electronic integrator, the second integrator also being connected to integrate the input rate signal $\dot{V}$. Since two time integrations of the same input term are involved, one is redundant, and the two must be made to agree if accurate computation is to be achieved. The aforementioned Fogarty application insures that the electronic integrator providing the $V^2$ term does not drift by "slaving" it to the servo. More specifically, the servo is provided with potentiometer means for deriving a $V^2$ correction voltage which is fed to the input circuit of the electronic integrator, and resistive negative feedback is provided in the electronic integrator to oppose the potentiometer-derived $V^2$ correction signal. This technique allows the $V^2$ output signal from the electronic integrator to be correct at all times in a dynamic sense, since the electronic integrator is responsive to high frequency changes, while drift over long periods of time is prevented. Unfortunately, it is often necessary to make the time constant of the correction signal quite short compared to the drift rate of the electronic integrator, and a comparatively strong potentiometer-derived drift correction signal is required to be applied to the integrator. Applying strong potentiometer-derived signals to the electronic integrator will be seen to deteriorate the quality of the $V^2$ output signal from the integrator from a "noise" standpoint. Thus the designer is often required either to allow more drift than is desirable or to re-introduce electromechanical "noise" in the $V^2$ output signal. The present invention provides an arrangement which is an improvement on this portion of the Fogarty invention, which improved arrangement assures correspondence in the face of a redundant integration but provides less deterioration of the "square" signal output potential.

Thus it is a principal object of the invention to provide improved analog computer apparatus which will receive an input signal varying as the time rate of change of a variable and produce an output signal varying as the square of the variable, wherein the output signal is relatively free from "noise" due to electromechanical function generator limitations.

Other objects of the invention will in part be obvious and will in part appear hereinafter.

The invention accordingly comprises the features of construction, combinations of elements, and arrangement of parts, which will be exemplified in the constructions hereinafter set forth, and the scope of the invention will be indicated in the claims.

The single figure of drawing illustrates an exemplary embodiment of the invention, as it may be used in conventional flight simulator computer apparatus, for receiving input potentials commensurate with accelerations of a simulated aircraft along the longitudinal axis of its flight path, and for providing a dynamically "clean" output potential commensurate with the square of simulated velocity. A potential commensurate with the component of aircraft engine thrust acceleration is applied at terminal 11 via summing resistor R–11, a potential commensurate with simulated profile drag deceleration is applied at terminal 12 via resistor R–12, a potential commensurate with a simulated acceleration due to a component of weight is applied at terminal 13 via resistance R–13, and a potential commensurate with simulated induced drag deceleration is applied at terminal 14 via resistor R–14, each of the components being taken along the longitudinal axis of the simulated flight path or "wind axis." In actual flight simulators additional or different potentials are often applied, but these shown in FIG. 1 will serve to illustrate the present invention. The direct potentials mentioned above are all algebraically summed by a conventional feedback amplifier summing circuit shown as comprising amplifier U-1 and feedback resistor R-15, thereby providing an output potential $\dot{V}$ at terminal 16 commensurate in magnitude and polarity with the net longitudinal acceleration of the simulated aircraft along the specified axis. The net acceleration potential $\dot{V}$ is applied to excite the winding of potentiometer R-16, the arm of which is positioned in accordance with simulated velocity V in a manner to be detailed below, thereby deriving a potential commensurate with $V\dot{V}$ on the arm of the potentiometer. This potential is applied via scaling resistor R-17 to the input terminal 17 of a conventional electronic integrator shown as comprising amplifier U-2 and feedback capacitor C-10. It will be seen that integrating the $V\dot{V}$ with respect to time will provide a $V^2$ output potential at terminal 18. As described thus far, the circuit shown completely follows the teachings of the abovementioned Fogarty application.

In the present invention the net acceleration potential $\dot{V}$ is inverted in polarity by a conventional feedback amplifier U-3 and applied via scaling resistor R-18 to the input circuit of a second electronic integrator shown as comprising amplifier U-4 and feedback capacitor C-11. Neglecting for the moment the input potentials applied to integrator U-4 via scaling resistors R-21 and R-27, it will be seen that integrator U-4 will integrate the net acceleration potential applied via resistance R-18 and thereby provide a potential at resistor R-22 commensurate with simulated velocity V. As shown, this potential is applied via scaling resistor R-22 to the input terminal 22 of a conventional grounded trainer position servo having a mechanical output shaft 23. Rebalancing potentiometer R-23 is driven by the servomechanism to provide a follow-up voltage via scaling resistor R-24. The resistance element of potentiometer R-23 is excited by a constant potential from the computer power supply (not shown). The servo rotates shaft 23, varying the follow-up voltage applied via R-24 until it exactly cancels the input voltage applied via resistor R-22, thereby providing a shaft output position commensurate with simulated velocity V. The output shaft 23 also positions the arm of potentiometer R-16 for a purpose mentioned above, and the arm of potentiometer R-26 to derive a voltage which varies in accordance with the square of simulated velocity. This latter voltage is applied via resistor R-21 to the input circuit of electronic integrator U-4. Rather than exciting linear potentiometer R-26 with the V output potential from integrator U-4, it is possible to use a single square function potentiometer or a pair of cascaded linear potentiometers excited with constant potentials, but the system shown is preferred, since it requires less parts and provides a potential at R-21 less subject to noise due to potentiometer resolution limitations.

It will be seen that the $V^2$ output voltage at terminal 18 will be dynamically clean since it is the output voltage from an electronic integrator, which provides a filtering action. Assuming that dynamically clean input potentials are applied to amplifier U-1, it will be seen that the only electromechanical "noise" which could be present at terminal 18 will arise from the multiplication performed by servo-operated potentiometer R-16. Step changes in the $V\dot{V}$ potential, which arise from this multiplication merely appear as changes in slope rather than changes in magnitude at terminal 18, however, so that output signal at terminal 18 is largely free from electromechanical "noise." Since no potentiometer-derived signal need be applied to the input circuit of integrator U-2 in order to prevent drift, the $V^2$ output potential will be smoother and more free from resolution jumps than the signal provided by the Fogarty arrangement.

The shaft 23 of the servo usually will be utilized to position further potentiometers and other devices in accordance with the quantity V, and it is important that the "clean" $V^2$ signal derived at terminal 18 be consistent with the shaft 23 position which represents V. To this end, the $V^2$ signal at terminal 18 is fed back to the input circuit of electronic integrator U-4 via scaling resistor R-27. During steady-state conditions (i.e., the $\dot{V}$ signal is zero), the $V^2$ potential applied via resistor R-27 will exactly balance and cancel out the $V^2$ potential of opposite polarity fed back via scaling resistor R-21. There being no input voltage applied via resistor R-18, the output voltage from integrator U-4 will remain constant, except for whatever variation may be caused by drift. Any variation in the U-4 integrator output voltage due to drift will cause the servo to re-adjust potentiometers R-25 and R-26, varying the voltage fed back via resistor R-21 until rebalancing is achieved. Now if the output voltage of integrator U-2 should drift, the change in signal applied to integrator U-4 via R-27 will be seen to cause a net input voltage at the input circuit of integrator U-4, causing the servo to alter its shaft position in such a direction as to correspond. Thus the servo output shaft position is made to agree with the dynamically clean output potential at terminal 18.

The electronic integrator U-4 and position servo may be replaced by a "velocity" or integrating servo and substantially equivalent operation obtained. Each of the electronic elements are in themselves well-known. In many embodiments of the invention the servo shown in block form will include a modulator such as a magnetic amplifier and will use an alternating current servomotor. Any servo utilized ordinarily will include usual servo refinements such as tachometer or other rate feedback for stabilization, reduction gearing, limit stops, etc. The operational amplifiers shown may be of conventional type, utilizing transistors as well as or in place of vacuum tubes. Longitudinal velocity is almost always treated solely in the forward direction in flight simulators, and for that reason the potentiometers driven by the servo are excited in contemplation that velocity will always be zero or finite in one sense. Various systems utilize square quantities which vary in both senses, and the invention also may be used therein. If the grounded ends of potentiometers R-23 and R-25 are excited with voltages of opposite polarity from those applied to terminals 26 and 27, bidirectional operation may be achieved.

It will thus be seen that the objects set forth above, among those made apparent from the preceding description, are efficiently attained, and since certain changes may be made in the above constructions without departing from the scope of the invention, it is intended that all matter contained in the above description or shown in the accompanying drawing shall be interpreted as illustrative and not in a limiting sense.

Having described my invention, what I claim as new and desire to secure by Letters Patent is:

1. Electronic analog computer apparatus for providing a dynamically clean output signal which varies as the square of a variable from an input signal commensurate with the time rate of change of said variable, comprising in combination, a first potentiometer connected to be excited by said input signal, integrating servo means having an output shaft connected to adjust said potentiometer to modify said input signal to provide a second signal, an electronic integrator responsive to said second signal and operable to integrate said second signal with respect to time to provide said output signal, said servo means being responsive to said input signal and operative to provide an output shaft position commensurate with the time integral of said input signal and commensurate with said variable, voltage-deriving means operated by said servo means for deriving a third potential commensurate with the square of said variable, circuit means for applying said third potential to the input circuit of said servo means, and circuit means for applying said output signal to the input circuit of said servo means.

2. Apparatus according to claim 1 in which said servo means comprises a second electronic integrator responsive to said input signal, said third potential and said output signal, and a position servomechanism responsive to said second electronic integrator to provide said shaft position.

3. Apparatus according to claim 1 in which said servo means comprises an integrating servomechanism responsive to said input signal, said third potential and said output signal and operative to provide said shaft position.

4. Apparatus according to claim 1 in which said voltage-deriving means comprises a pair of cascaded linear potentiometers mechanically operated by said servo means.

5. Apparatus according to claim 1 in which said voltage-deriving means comprises a shaped potentiometer having a square function voltage versus displacement characteristic.

6. Apparatus according to claim 2 in which said voltage-deriving means comprises a linear second potentiometer connected to be excited by said second electronic integrator and connected to be mechanically positioned by said position servomechanism thereby to derive said third potential.

References Cited in the file of this patent
UNITED STATES PATENTS
3,018,051    Hemstreet _____ Jan. 23, 1962

OTHER REFERENCES

Davis: 31 Ways to Multiply, Control Engineering, vol. 1, No. 3, November 1954, page 45.

Davidson: Basic Math with AC Analogs, Control Engineering, vol. 2, No. 3, March 1955, pages 61, 64 and 66.